(12) United States Patent
Orr

(10) Patent No.: US 7,408,161 B2
(45) Date of Patent: Aug. 5, 2008

(54) INVESTIGATIONS

(75) Inventor: Christopher H. Orr, Cumbria (GB)

(73) Assignee: Bil Solutions Limited, Daresbury, Warrington (GB)

( * ) Notice: Subject to any disclaimer, the term of this patent is extended or adjusted under 35 U.S.C. 154(b) by 240 days.

(21) Appl. No.: 11/018,866

(22) Filed: Dec. 21, 2004

(65) Prior Publication Data
US 2006/0065832 A1    Mar. 30, 2006

(30) Foreign Application Priority Data
Dec. 22, 2003 (GB) ................. 0329539.1
Mar. 27, 2004 (GB) ................. 0406947.2

(51) Int. Cl.
*G01T 1/20* (2006.01)
(52) U.S. Cl. ................. 250/361 R
(58) Field of Classification Search ......... 250/361 R
See application file for complete search history.

(56) References Cited

U.S. PATENT DOCUMENTS

| | | | |
|---|---|---|---|
| 4,187,427 A | | 2/1980 | Cusano |
| 4,286,158 A | | 8/1981 | Charpak et al. |
| 4,483,816 A | * | 11/1984 | Caldwell et al. ............ 376/158 |
| 4,590,377 A | | 5/1986 | Lukens |
| 4,866,277 A | | 9/1989 | Johnson et al. |
| 5,025,150 A | * | 6/1991 | Oldham et al. ............. 250/253 |
| 5,231,290 A | * | 7/1993 | Czirr et al. ............. 250/390.11 |
| 5,453,623 A | | 9/1995 | Wong et al. |
| 5,531,228 A | | 7/1996 | Doerfel |
| 5,548,116 A | | 8/1996 | Pandelisev |
| 5,866,907 A | * | 2/1999 | Drukier et al. ............. 250/366 |
| 6,610,977 B2 | * | 8/2003 | Megerle ............. 250/287 |
| 6,740,886 B1 | | 5/2004 | Hughes |
| 6,740,887 B1 | | 5/2004 | Parvin et al. |
| 7,075,304 B2 | * | 7/2006 | Nelson ............. 324/329 |

FOREIGN PATENT DOCUMENTS

| | | |
|---|---|---|
| DE | 42 00 308 A1 | 7/1993 |
| EP | 0 178 068 A2 | 4/1988 |
| EP | 0 667 539 A1 | 8/1995 |
| EP | 0 821 247 A3 | 1/1998 |
| GB | 2 399 632 A | 9/2004 |
| JP | 7-306291 | 11/1995 |
| JP | 11-202052 | 7/1999 |
| WO | WO 94/01789 | 1/1994 |
| WO | WO 02/42796 A1 | 5/2002 |

OTHER PUBLICATIONS

Kathleen M. Gruetzmacher et al., *Operating the WAND and HERCULES Prototype Systems*, WM'01 Conference, Tucson, Arizona, Feb. 2001, LA-UR-01-445.
Kathleen M. Gruetzmacher et al., *Using the HERCULES System to Segregate Room Trash from the LANL Plutonium Facility and CMR Building*, Proceedings of ICEM'03, Sep. 2003, Oxford, England, Paper No. 4975.

* cited by examiner

*Primary Examiner*—Christine Sung
(74) *Attorney, Agent, or Firm*—Workman Nydegger

(57) ABSTRACT

Apparatus and methods are provided for establishing the nature and level of radioactive sources within waste, particularly of a compactable nature. Detectors sensitive to low energy level radiation are provided with protection against dust contamination. Further detector configurations are provided to establish the presence of metallic material and/or higher energy level gamma emissions and/or detectors with a lower sensitivity to the emissions and/or detector configurations sensitive to neutrons are further provided.

25 Claims, 7 Drawing Sheets

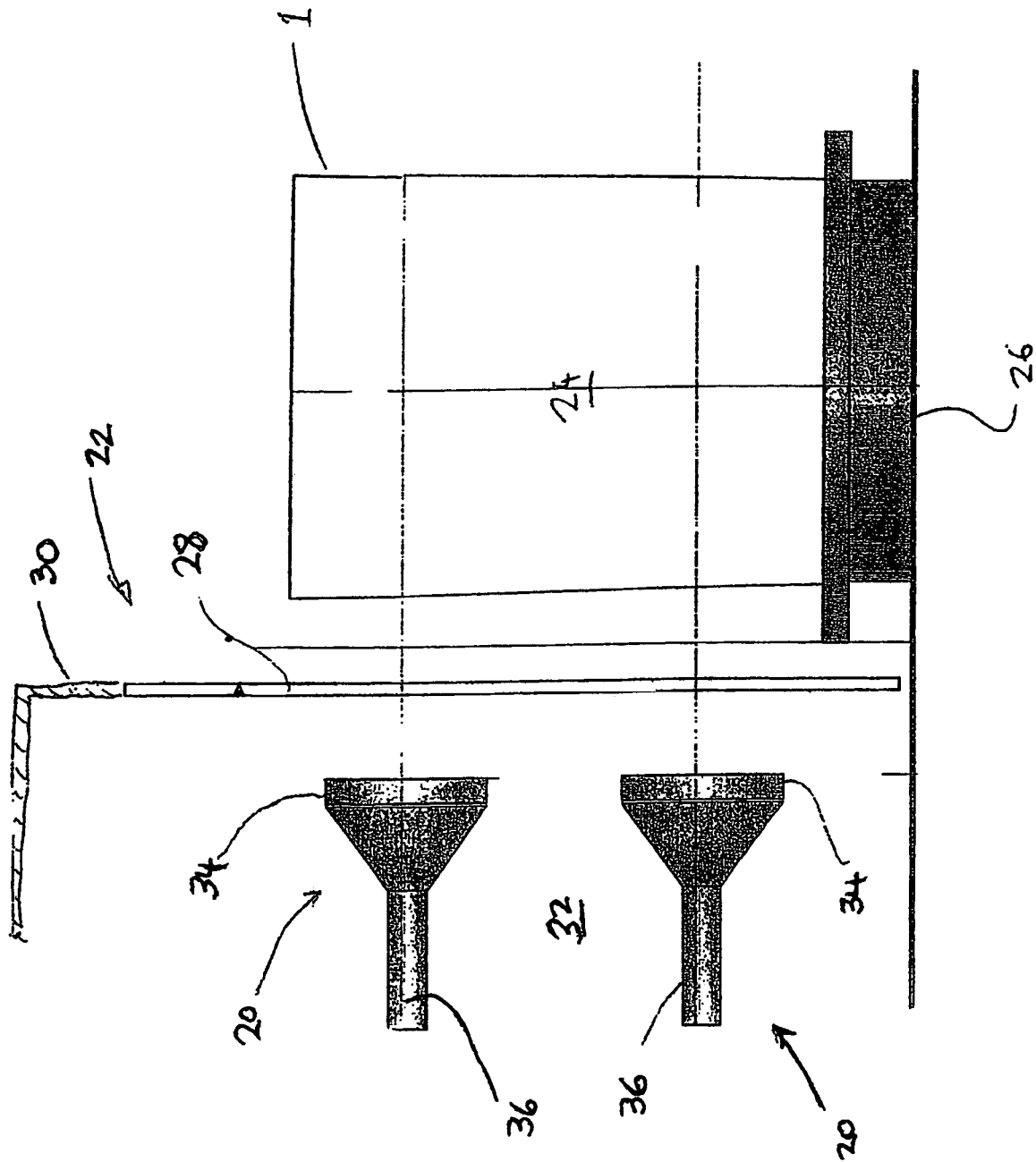

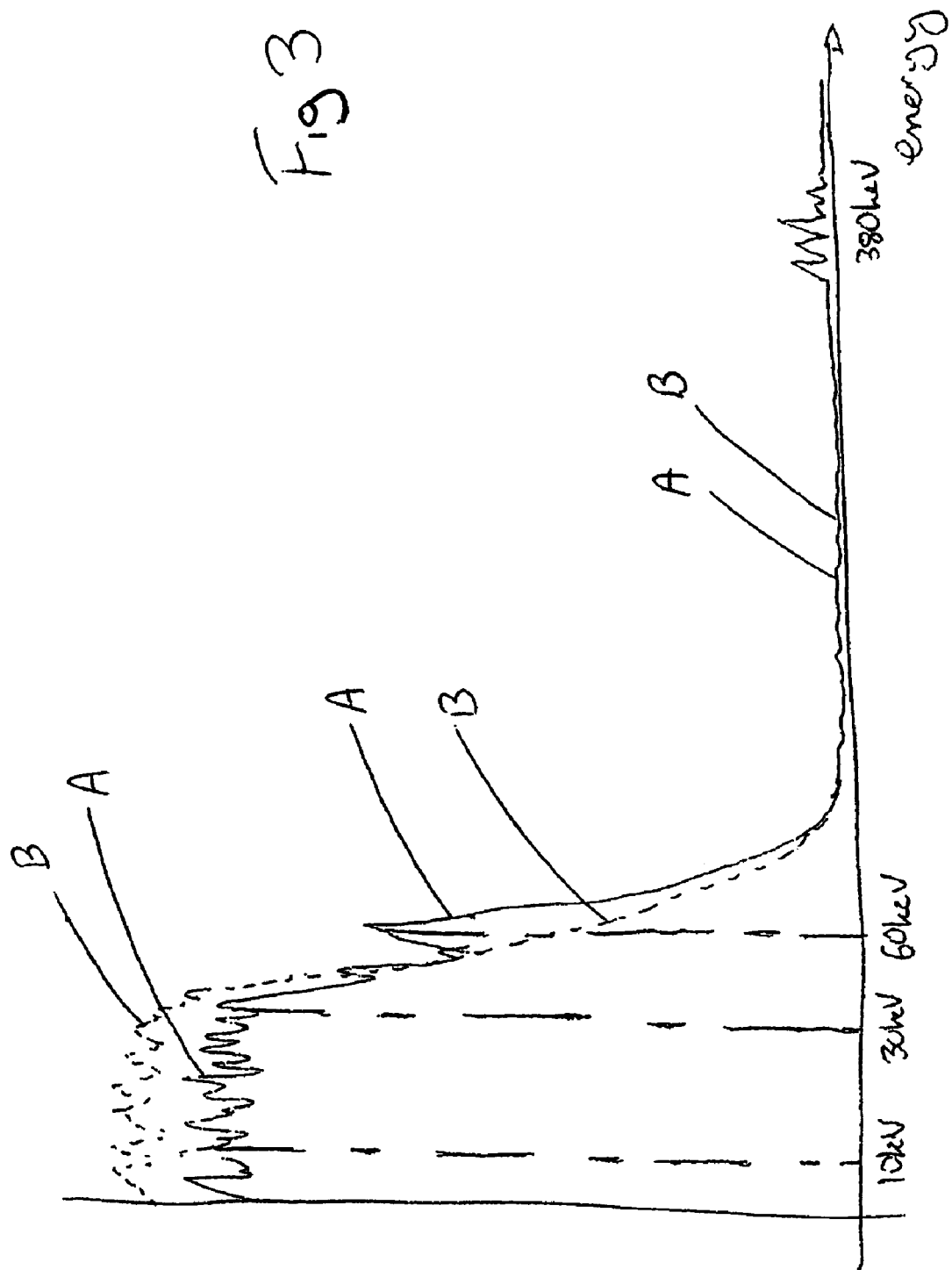

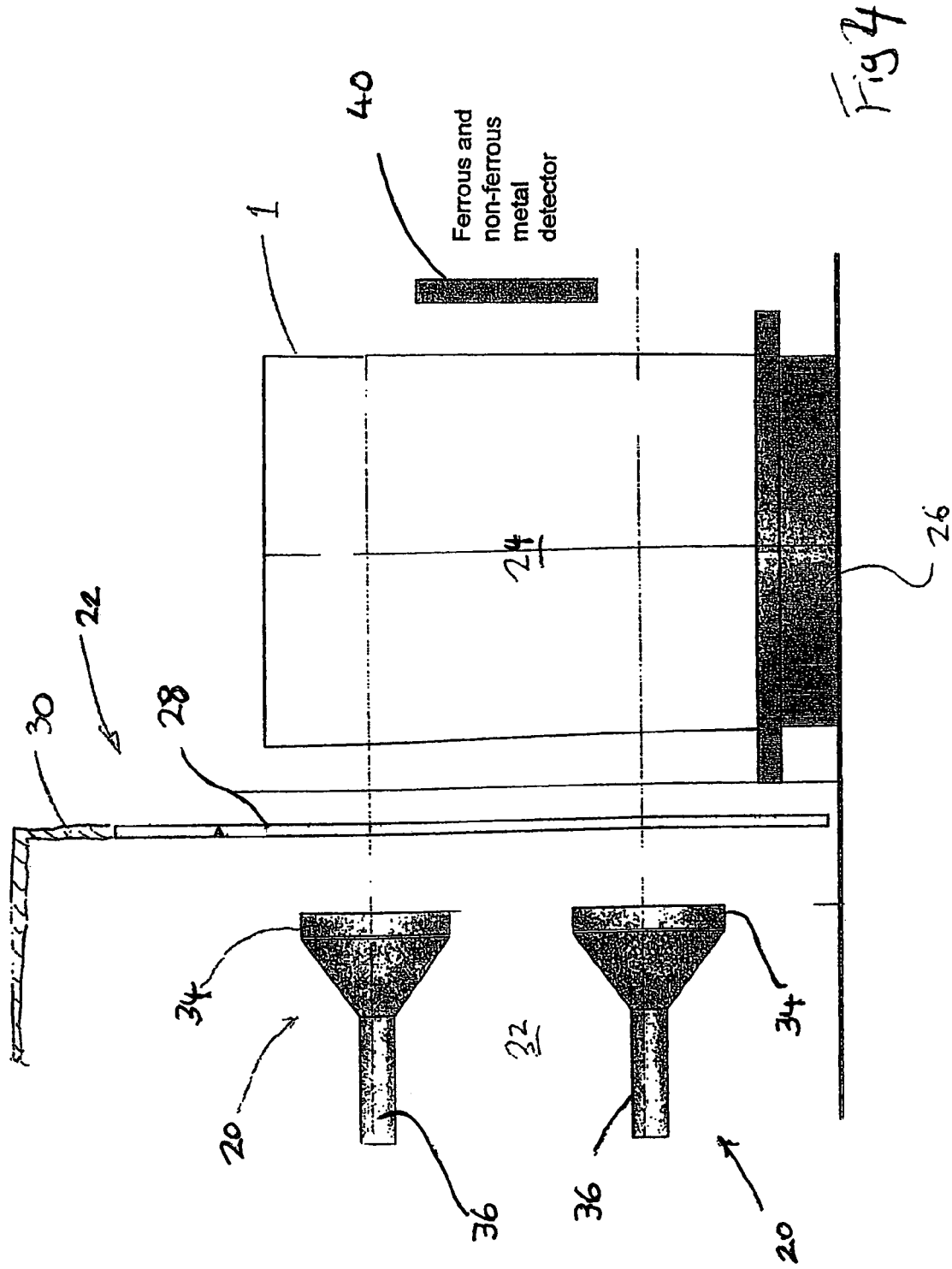

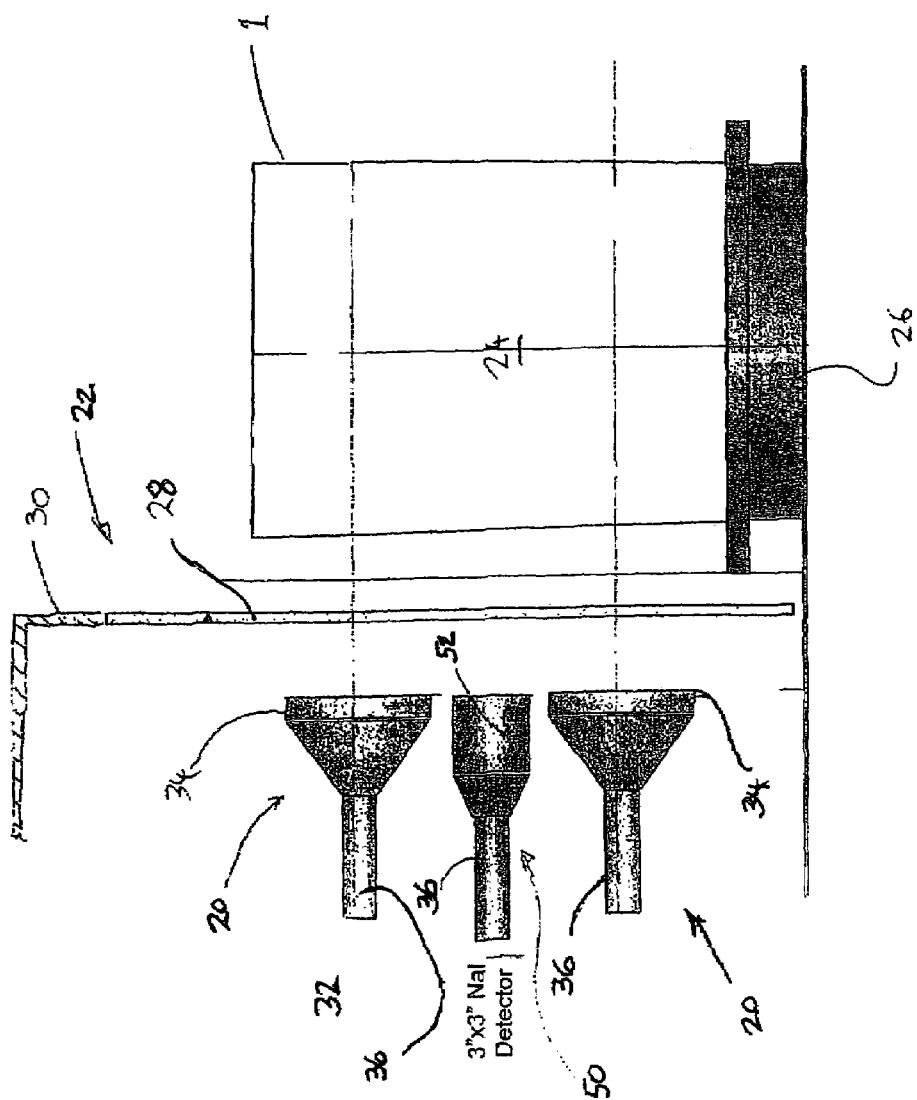

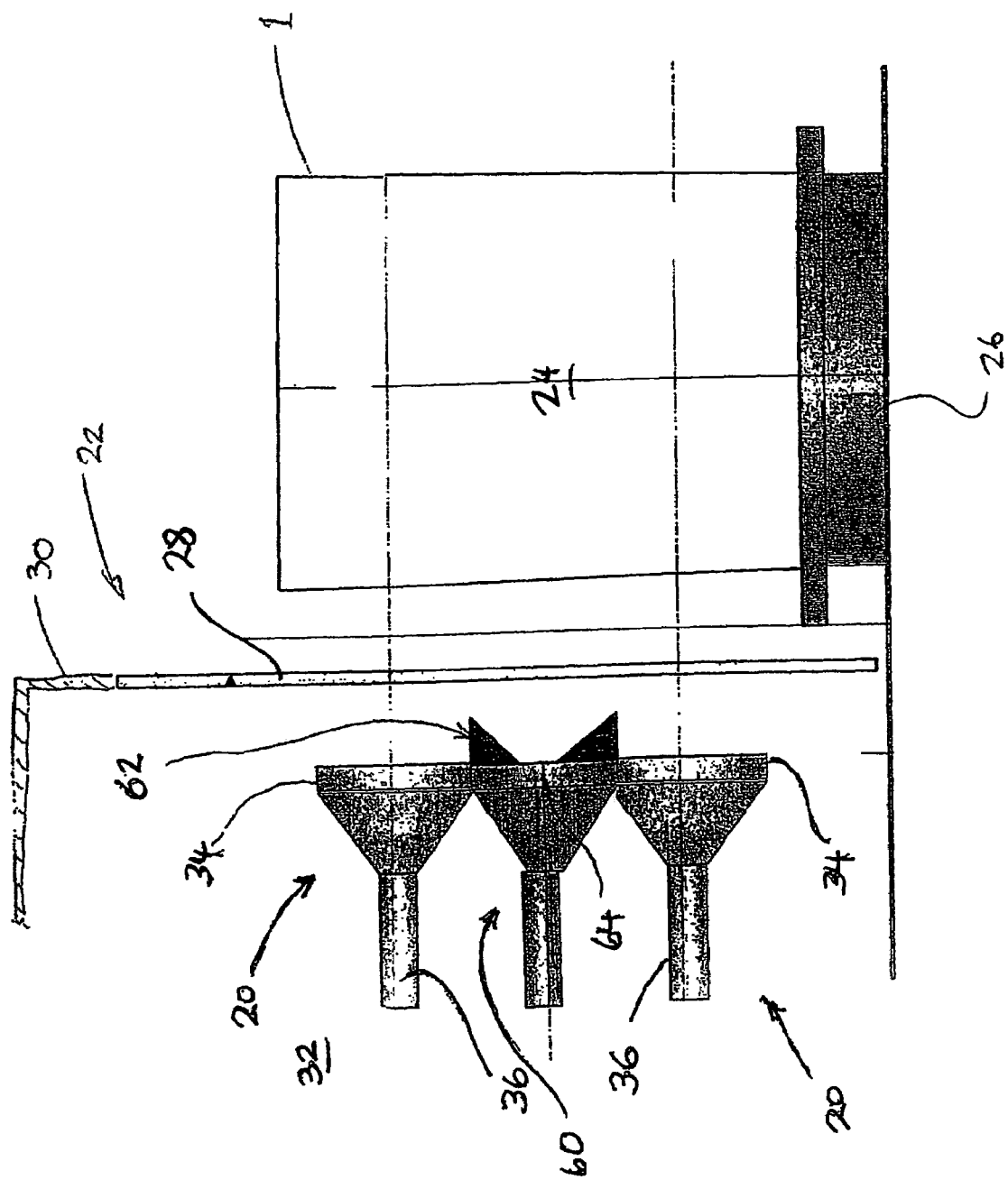

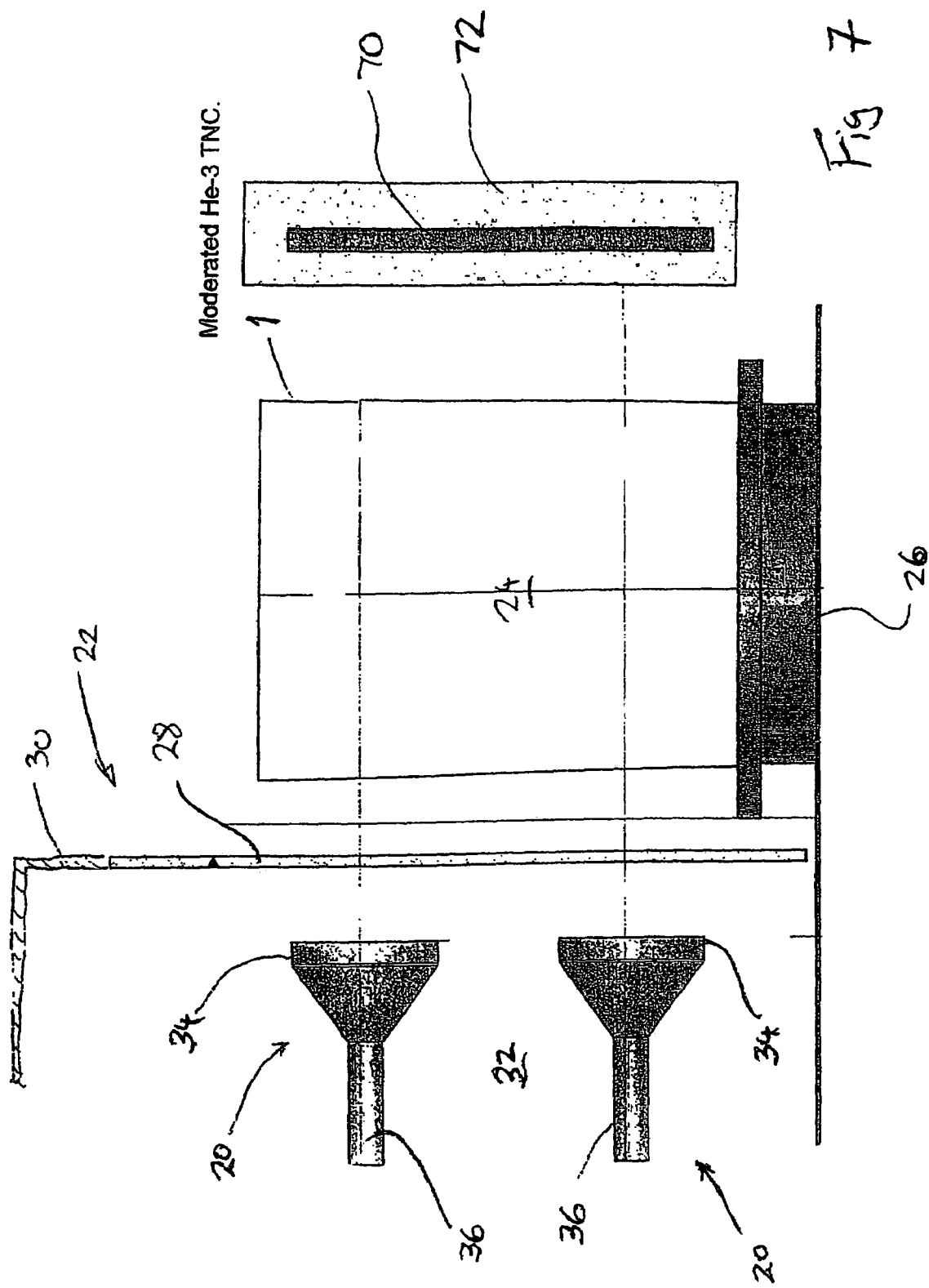

INVESTIGATIONS

BACKGROUND OF THE INVENTION

1. The Field of the Invention

The present invention is concerned with improvements in and relating to investigations of materials, particularly of materials which may include radioactive sources within them.

2. The Relevant Technology

In a wide variety of circumstances it is desirable to be able to determine the nature and amount of radioactive sources within a material. One such circumstance is the determination of which category of waste the contents of a container should be put in. The more hazardous the category of waste the contents of a container are put in, the higher the cost of the safe storage or disposal route to be used. Accurate classification of material into the lowest level category applying is desirable.

Some instruments exist which use an array of gamma detectors to provide a radioactive source present/no radioactive source present indication for a volume of waste. To do so, the instrument requires that the volume of waste be spread thinly on a conveyor to ensure exposure of sources to the detectors or be presented in a relatively small container. Even then, the instrument also requires that the nature of the waste is well known so as to be sure that no "problem" waste materials are present. Such "problem" materials include shielding materials such as metals, etc. Such instruments are thus limited in terms of the range of materials they can handle, throughput of materials they can handle and rely upon assumptions about the material introduced. They are also limited to a present/absent style determination, rather than any quantification.

SUMMARY OF THE INVENTION

The present invention has amongst its aims to provide a quantitative measure of radioactive sources present within a material. The present invention has amongst its aims to enable a wide variety of different waste types to be handled, particularly compactable materials. The present invention has amongst its aims the ability to make a determination which is not reliant upon assumptions as to waste materials present.

According to a first aspect of the invention we provide apparatus for obtaining information on radioactive material associated with a body of material, the apparatus including:

a first type detector, the detector having a field of view which includes at least part of an investigating location;

a housing, the housing enclosing the first type detector, the housing including a non-metallic portion between the first type detector and that part of the investigating location within the field of view of the first type detector.

The information may be the presence and/or absence of radioactive material from the body of material. The information may be the quantity of radioactive material associated with the body of material. The quantity may be expressed as a mass of one or more isotopes. The quantity may be expressed as an effective mass of an element or isotope. The quantity may be expressed as an activity level per unit mass of the body of material, particularly as a Bq/g value.

The radioactive material may include plutonium and/or decay products thereof. The radioactive material may include americium, particularly $^{241}$Am.

The radioactive material may be associated with the body of material by being mixed in therewith. The radioactive material may be associated with the body of material by being on one or more surfaces of one or more items making up the body of material.

The body of material may include paper and/or plastics and/or glass and/or rubber and/or wood and/or fabric material. The body of material may be homogenous and/or heterogenous.

Two or more first type detectors may be provided. The first type of detector may be defined in terms of the photomultiplier and/or scintillator and/or collimator, if any, that type possesses. Preferably at least two first type detectors are provided. Preferably the first type detectors are mounted above one another, ideally vertically. The first type detectors may be provided with a scintillator, preferably in the form of a crystal. A NaI scintillator is preferred for the first type of detector. The scintillator/crystal of the first type of detector may be between 1.00 mm and 3.00 mm thick. Preferably the scintillator/crystal is between 1.4 mm and 1.8 mm. Ideally the scintillator/crystal has a thickness of 1.6 mm. The thickness may be measured perpendicular to the front or rear face of the scintillator/crystal and/or may be the minimum dimension through the scintillator/crystal and/or may be measured along the axis of the photomultiplier. The scintillator/crystal may have a circular cross-section. The scintillator/crystal may have a diameter of between 50 mm and 300 mm, more preferably between 00 mm and 150 mm and ideally 127 mm plus or minus 10%. The scintillator/crystal is preferably sensitive to radiation of energy of 10 keV to 30 keV. The scintillator/crystal is preferably sensitive to radiation of energy of 55 keV to 65 keV. The scintillator/crystal is preferably sensitive to radiation of energy between 20 keV and 60 kev. The scintillator/crystal is preferably sensitive to radiation of energy between 10 keV and 70 keV. The scintillator/crystal is preferably sensitive to radiation of energy between 5 keV and 80 keV. The scintillator/crystal is preferably not sensitive to radiation of energy greater than 500 keV, more preferably energy greater than 250 keV and ideally radiation of greater than 150 keV.

Preferably the scintillator/crystal is optically connected to a photomultiplier. The photomultplier preferably generates a signal in response to a scintillation. Preferably the signal, directly or indirectly is fed to a processor.

The field of view of the first type of detector may be defined by the directions in which the first type of detector is sensitive to radiation. The field of view of the first type of detector may be defined by the shape of the non-metallic portion of the housing. The field of view of the first type of detector may be defined by a collimator provided between the detector and the non-metallic portion of the housing. The field of view may be conical.

Preferably all of the investigating location is within the field of view of at least one of the first type of detectors. Preferably all of the investigating location is within the field of view of each of the first type of detectors. The position of the first type detectors and/or vertical distance between the first type detectors and/or horizontal distance between first type detectors and investigation location is preferably provided so as to give a near-uniform sensitivity to radiation from the investigating location, and ideally a uniform sensitivity. The investigating location may be that volume occupied by the body of material, in use. The investigating location may be that volume occupied by a container for the body of material in use.

The container for the body of material may be non-metallic, such as plastics. The container for the body of material may be metallic, such as a wire basket. The container for the body of material may be a basket. Preferably the container is shaped and/or dimensioned and/or made of material so as to give substantially no attenuation of emissions from the body of material. The container may be cylindrical. The container may have a removable lid. One or more further containers may be provided within the container. The container and/or one or more further containers may be bags, such as plastic bags. The container may be of even thickness, particularly in terms of the thickness of the container's material between the body of material and the first type detectors.

The housing may be of metal, for instance steel. The housing may have a skin of at least 1 mm thickness. A thickness of at least 2 mm is preferred.

The housing may enclose a first type detector environment. The first type detector environment may be thermostatically controlled. The first type detector environment may be maintained at a temperature above ambient. The housing is preferably dust tight.

The non-metallic portion may be of plastics. The non-metallic portion may have a thickness of between 1 and 3 mm. The non-metallic portion may be flush with the wall of the housing. Preferably the non-metallic portion maintains the dust tight detector environment. Preferably the non-metallic portion is opaque.

The first aspect of the invention may include any of the features, options or possibilities set out elsewhere in this application, including the second and other aspects.

According to a second aspect of the invention we provide a method for obtaining information on radioactive material associated with a body of material, the method including providing an apparatus including a first type detector and a housing;

introducing a body of material to an investigating location by the apparatus;

detecting emissions from the radioactive material associated with the body of material, over a period of time, using the first type detector, the first type detector generating first type detector signals;

processing the first type detector signals to give the information on the radioactive material associated with the body of material;

wherein, the housing encloses the first type detector, the housing includes a non-metallic portion between the first type detector and that part of the investigating location within the field of view of the first type detector.

The body of material may be introduced to the investigating location by lateral movement of the body of material to the investigating location, for instance on a conveyor table. The body of material may be moved to the investigating location by lifting.

The body of material may be removed from the investigating location after the period of time. The body of material may be moved to one of a number of different types of location, directly or via one or more intermediate locations. The location may be a low level radioactive waste site. The location may be a plutonium contaminated material storage or disposal site. The type of location to which the body of material is removed may be determined by the information obtained on the radioactive material associated with the body of material. Where the information is that the quantity of radioactive material is below a first threshold, the body of material may be removed to a first type of location. Where the information is that the quantity of radioactive material is at or above a first threshold and below a second higher threshold, the body of material may be removed to a second type of location, such as a low level radioactive waste site. Where the information is that the quantity of radioactive material is above a second threshold, the body of material may be removed to a third type of location, such as a plutonium contaminated material storage or disposal site.

The period of count time may be between 10 and 1000 seconds.

The detected emission from the first detector type are preferably used to generate a first detector type count rate.

The data processor may receive signals from one or more detectors of the first type. One or more first detector type count rates may be obtained. The signals received and/or count rate(s) may be corrected. The signals and/or count rate(s) may be corrected for ambient radioactivity levels, for instance by subtracting a measure of background radiation, such as a count rate from the first detector type count rate. The first detector type count rate(s) may be corrected for the detectors sensitivity at the energy for the signals detected. Preferably the energy of as well as occurrence of an emission are obtained. The signals and/or count rate(s) may be corrected for attenuation by the body of material. Such correction may be based on a calculated density for the body of material.

The body of material may be rotated during the performance of the method. The body of material may be rotated between performances of the method, for instance so as to present different parts of the body of material closest to the first type detector and/or to provide a more uniform measurement sensitivity for radioactivity from the investigating location.

The processor may determine the amount of an isotope present in the body of material from the count rate at a particular energy. The energy may be 60 keV+/−1 keV. The isotope may be $Am^{241}$. The determination of the amount of isotope present may include a factor relating to the age of the radioactive material, for instance the time elapsed since it was subjected to one or more processes, for instance its separation from one or more other elements or isotopes.

The processor may determine the amount of the other isotopes and/or elements present by reference to one or more known ratios between the measured isotope and the other isotopes and/or elements. The ratios may have been determined previously by chemical assay. The chemical assay may determine the radionucleide fingerprint or "nuclide vector" for the plant and/or fuel batch being processed and/or a processing unit within a plant. In particular, the amount of $^{241}Am$ may be used to infer the amount of mixed oxide fuel (MOX) present. In particular, the amount of $^{241}Am$ may be used to infer the amount of plutonium present. In particular the ratios linking $^{238}Pu$, $^{239}Pu$, $^{240}Pu$, $^{241}Pu$, $^{242}Pu$ may be used. The radionucleide fingerprint in combination with one or more of the amount of $^{241}Am$ and/or $^{238}U$ and/or $^{235}U$ and/or one or more of the plutonium isotopes $^{238}Pu$, $^{239}Pu$, $^{240}Pu$, $^{241}Pu$, $^{242}Pu$ may be used. The amount of $^{241}Am$ may be established by considering the count rate an energy of 60 keV+/−1 keV. The amount of $^{238}U$ may be determined by considering the count rate in the range 90-100 keV and more particularly at energies within that range indicative of $^{238}U$. The amount of $^{235}U$ may be determined by considering the count rate in the range 186 keV+/−2 keV. The amount of plutonium may be determined by considering the count rate in the range 10-30 keV.

The processor may determine the amount of a group of isotopes present in the body of material from the count rate at a particular energy and/or range of energies. The energy range may be between 10 keV and 30 keV, particularly for plutonium isotopes. The energy range may be 60 keV+/−1 keV particularly for $^{241}Am$. The isotopes may be the fissile isotopes out of $^{238}Pu$, $^{239}Pu$, $^{240}Pu$, $^{240}$, $^{241}Pu$, $^{242}Pu$ and $^{241}Am$.

The processor may determine the amount of each of the isotopes present by reference to one or more known ratios between the measured isotopes and the other isotopes and/or elements. The ratios may have been determined previously by chemical assay. In particular the ratios linking $^{238}$Pu, $^{239}$Pu, $^{240}$Pu, $^{241}$Pu, $^{242}$Pu, $^{241}$Am may be used.

The processor may determine the amount of the other isotopes present by reference to one or more known ratios between the measured isotope and the other isotopes when the count rate at the energy for that measured isotope is above a level, for instance a count rate at that energy which is statistically significant to a desired degree relative to the count rates observed at adjacent energies. The processor may determine the amount of a group of isotopes present in the body of material from the count rate at a particular range of energies when the count rate at the energy for which the single isotope measurement would be made is below a level, for instance a count rate at that energy which is statistically insignificant to a desired degree relative to the count rates observed at adjacent energies. Where both the determinations can be made, they may both be used to determine the amount of radioactive material associated with the body of material. A discrepancy between the two amounts determined may indicate an incorrectly stated age for the radioactive material associated with the body of material or an incorrect radionucleide fingerprint.

The body of material may be weighed as part of the method, particularly at the investigating location. The activity of the radioactive material associated with the body of material may be divided by the mass of the body to give an activity per unit mass measure for the body of material.

The method may include determining the total weight for the body of material. If the total weight of the body of material is above a threshold then an indication may be provided to the operator. If the total weight is above a threshold then the type of location to which the body of material may subsequently be moved to may be restricted or so determined. The threshold may be 50% higher than the average total weight anticipated for the body of material. A total weight above a threshold may be seen as indicative of the measurement technique no longer being sufficiently reliable. An additional safeguard where exceptionally large amounts of dense material were present within the body of material is thus provided.

The second aspect of the invention may include any of the features, options or possibilities set out elsewhere in this application, including the first and other aspects.

According to a third aspect of the invention we provide apparatus for obtaining information on radioactive material associated with a body of material, the apparatus including:
  a first type detector, the detector having a field of view which includes at least part of an investigating location; and
  a metal detector.

The third aspect of the invention may include any of the features, options or possibilities set out elsewhere in this application, including the first and other aspects. But may particularly include from amongst the following.

Two or more first type detectors may be provided. The first type of detector may have a scintillator/crystal of between 1.4 mm and 1.8 mm. Ideally the scintillator/crystal has a thickness of 1.6 mm. The scintillator/crystal may have a diameter of between 100 mm and 150 mm and ideally 127 mm plus or minus 10%. The scintillator/crystal is preferably sensitive to radiation of energy between 20 keV and 60 kev. The scintillator/crystal is preferably sensitive to radiation of energy between 10 keV and 70 keV.

The first detector type may be provided within a housing. The housing may enclose the first type detector. The housing may include a non-metallic portion between the first type detector and that part of the investigating location within the field of view of the first type detector.

The metal detector is preferably sensitive to ferrous and non-ferrous metals. The sensitivity of the metal detector may be variable. The sensitivity of the metal detector may be adjusted to vary the amount of metal which must be detected to give an indication as to the presence of metal within the body of material. A single detector may be provided. A plurality of metal detectors may be provided. Different detectors sensitive to different types of metal, such as ferrous and non-ferrous, may be provided. Preferably the metal detectors are provided outside that part of the field of view extending between the first type detector and the investigating location. In use, the metal detector may be provided on the opposite side of the body of material to the first type detector.

The apparatus may provide an indication as to the presence and/or absence of metal from the body of material. The indication may be visual and/or audible. The presence of metal may trigger an alarm. The alarm may be visual and/or audible.

According to a fourth aspect of the invention we provide a method for obtaining information on radioactive material associated with a body of material, the method including
  providing an apparatus including a first type detector and a metal detector;
  introducing a body of material to an investigating location by the apparatus;
  detecting emissions from the radioactive material associated with the body of material, over a period of time, using the first type detector, the first type detector generating first type detector signals;
  processing the first type detector signals to give the information on the radioactive material associated with the body of material; and
  detecting for any metal present within the body of material.

The fourth aspect of the invention may include any of the features, options or possibilities set out elsewhere in this application, including the first and other aspects. But may particularly include from amongst the following.

The detection for the presence of metal in the body of material may be performed before and/or during and/or after the detecting for emissions. The body of material may be rotated during the detection for the presence of metal in the body of material.

According to a fifth aspect of the invention we provide apparatus for obtaining information on radioactive material associated with a body of material, the apparatus including:
  a first type detector, the first type detector having a field of view which includes at least part of an investigating location; and
  a second type detector, having a field of view which includes at least part of the investigating location.

The information obtained may be the presence of radioactive material associated with the body of material at or above a level, particularly when the information is obtained from the second type detector. The quantity may be expressed as an activity level per unit mass of the body of material, particularly as a Bq/g value.

The second type of detector may be defined in terms of the photomultiplier and/or scintillator and/or collimator, if any, that type possesses. Preferably the second type detectors are provided with a scintillator, preferably in the form of a crystal. A NaI scintillator is preferred for the second type of detector. The scintillator/crystal of the second type of detector may be between 20 mm and 150 mm thick, preferably between 30 mm and 100 mm, more preferably between 40 mm and 80 mm and ideally between 45 mm and 80 mm thick. The scintillator/crystal may have a circular cross-section. The scintillator/crystal may have a diameter of between 30 mm and 150 mm, more preferably between 40 mm and 100 mm and ideally 45 to 80 mm. The scintillator/crystal is preferably sensitive to radiation of energy 380 keV. The scintillator/crystal is preferably sensitive to radiation of energy between 250 keV and 450 keV. The scintillator/crystal is preferably not sensitive to radiation of energy less than 100 keV. Particularly where detection of $^{238}$U is required, the scintillator/crystal may be sensitive to radiation of energy 500 keV to 2000 keV.

Preferably the scintillator/crystal is optically connected to a photomultiplier. The photomultplier preferably generates a signal in response to a scintillation. Preferably the signal, directly or indirectly is fed to a processor.

The second type detector is preferably provided between two first type detectors.

The field of view of the second type of detector may be defined by the directions in which the second type of detector is sensitive to radiation. The field of view of the second type of detector may be defined by the shape of the housing or a portion there of. The field of view of the second type of detector may be defined by a collimator provided between the detector and the housing, but preferably the second type detector is non-collimated. The field of view may be conical.

Preferably all of the investigating location is within the field of view of at least one of the second type of detectors. Preferably all of the investigating location is within the field of view of each of the second type of detectors.

The second type detector may be used to verify the accurate performance of the first detector type, particularly when a high count rate is experienced. Preferably the energy range to which the second detector type is sensitive is higher than the energy range to which the first type detector is sensitive. Preferably the range of activity levels for which the first type detector instrument is sensitive is lower than the range of activity levels for which the second type detector instrument is sensitive. Preferably the two ranges overlap partially.

The first type of detector is preferably used to provide information on the radioactive material associated with the body of material where the count rate for the second type detector is below a count rate value. The count rate value which defines this threshold may be preset and/or may be variable between operations. Preferably the second type detector is used to provide information on the radioactive material associated with the body of material where the count rate for the second type detector is at or above a count rate value. The count rate value may be a count rate value at or above which the accuracy of a determination made using the first type detector is questionable, for instance when the count rate is too high to be handled by the first type detector and/or its supporting electronics.

The second type detector may be used to provide information on the radioactive material associated with the body of material where the count rate for the first type detectors is above a count rate value. The count rate value may be a count rate value at which the accuracy of the information obtained from the first type detector is questionable. The count rate value may be pre-determined.

The second type detector may be used to provide information on the radioactive material associated with the body of material where the count rate for the second type detector is higher than for the first type detector. A higher count rate value for the second type detector than the first type detector may indicate a count rate value for the first type detector which is of questionable accuracy, for instance when the count rate is too high to be handled by the first type detector and/or its supporting electronics, eg, at high dead time values for the first type detector systems.

The second type detector may be used to provide information on the radioactive material associated with the body of material where the count rate for the first type detectors is below a count rate value and/or above a count rate value and/or where the second type detector count rate is higher than the first type detector count rate.

The apparatus may provide an indication as to the presence of a count rate for the second type detector when none is detected for the first type detector and/or the level detected is below a certain count rate value and/or where the second type detector count rate is higher than the first type detector count rate. The indication may be visual and/or audible. The presence of such a count rate may trigger an alarm. The alarm may be visual and/or audible. The presence of such a count rate may inhibit one or more operations of the instrument, such as the production of a document on the radioactivity associated with the body of material.

The fifth aspect of the invention may include any of the features, options or possibilities set out elsewhere in this application, including the other aspects.

According to a sixth aspect of the invention we provide a method for obtaining information on radioactive material associated with a body of material, the method including
  providing an apparatus including a first type detector and a second type detector;
  introducing a body of material to an investigating location by the apparatus;
  detecting emissions from the radioactive material associated with the body of material, over a period of time, using the first type detector, the first type detector generating first type detector signals;
  detecting emissions from the radioactive material associated with the body of material over a period of time, using the second type of detector, the second type of detector generating second type detector signals;
  processing the first type detector signals and/or second type signals to give the information on the radioactive material associated with the body of material.

The second type detector may be used to verify the accurate performance of the first detector type, particularly when a high count rate is experienced. Preferably the energy range to which the second detector type is sensitive is higher than the energy range to which the first type detector is sensitive. Preferably the range of activity levels for which the first type detector instrument is sensitive is lower than the range of activity levels for which the second type detector instrument is sensitive. Preferably the two ranges overlap partially.

The first type of detector is preferably used to provide information on the radioactive material associated with the body of material where the count rate for the second type detector is below a count rate value. The count rate value which defines this threshold may be preset and/or may be variable between operations. Preferably the second type detector is used to provide information on the radioactive material associated with the body of material where the count rate for the second type detector is at or above a count rate value. The count rate value may be a count rate value at or above which the accuracy of a determination made using the first type detector is questionable, for instance when the count rate is too high to be handled by the first type detector and/or its supporting electronics, eg. at high dead-time values for the first type detector systems.

The second type detector may be used to provide information on the radioactive material associated with the body of material where the count rate for the first type detectors is above a count rate value. The count rate value may be a count rate value at which the accuracy of the information obtained from the first type detector is questionable. The count rate value may be pre-determined.

The second type detector may be used to provide information on the radioactive material associated with the body of material where the count rate for the second type detector is higher than for the first type detector. A higher count rate value for the second type detector than the first type detector may indicate a count rate value for the first type detector which is of questionable accuracy, for instance when the count rate is too high to be handled by the first type detector and/or its supporting electronics.

The second type detector may be used to provide information on the radioactive material associated with the body of material where the count rate for the first type detectors is below a count rate value and/or above a count rate value and/or where the second type detector count rate is higher than the first type detector count rate.

The apparatus may provide an indication as to the presence of a count rate for the second type detector when none is detected for the first type detector and/or the level detected is below a certain count rate value and/or where the second type detector count rate is higher than the first type detector count rate. The indication may be visual and/or audible. The presence of such a count rate may trigger an alarm. The alarm may be visual and/or audible. The presence of such a count rate may inhibit one or more operations of the instrument, such as the production of a document on the radioactivity associated with the body of material.

The sixth aspect of the invention may include any of the features, options or possibilities set out elsewhere in this application, including the other aspects.

According to a seventh aspect of the invention we provide apparatus for obtaining information on radioactive material associated with a body of material, the apparatus including:
  a first type detector, the first type detector having a field of view which includes at least part of an investigating location; and
  a third type detector, having a field of view which includes at least part of the investigating location.

The information obtained may be the presence of radioactive material associated with the body of material at or above a level, particularly when the information is obtained from the second type detector. The quantity may be expressed as an activity level per unit mass of the body of material, particularly as a Bq/g value.

The third type of detector may be defined in terms of the photomultiplier and/or scintillator and/or collimator, if any, that type possesses. Preferably the third type detectors are provided with a scintillator, preferably in the form of a crystal. Preferably the third type detectors are provided with the same type of scintillator/crystal as the first type detectors. Preferably the third type detectors are provided with the same type of photomultiplier as the first type detectors. Preferably the third type detectors are provided with the same type of supporting electronics as the first type detectors. A NaI scintillator is preferred for the third type of detector. The scintillator/crystal of the third type of detector may be between 1.00 mm and 3.00 mm thick. Preferably the scintillator/crystal is between 1.4 mm and 1.8 mm. Ideally the scintillator/crystal has a thickness of 1.6 mm. The thickness may be measured perpendicular to the front or rear face of the scintillator/crystal and/or may be the minimum dimension through the scintillator/crystal and/or may be measured along the axis of the photomultiplier. The scintillator/crystal may have a circular cross-section. The scintillator/crystal may have a diameter of between 50 mm and 300 mm, more preferably between 100 mm and 150 mm and ideally 127 mm plus or minus 10%. The scintillator/crystal is preferably sensitive to radiation of energy 10 keV to 30 keV. The scintillator/crystal is preferably sensitive to radiation of energy 55 keV to 65 keV. The scintillator/crystal is preferably sensitive to radiation of energy between 26 keV and 60 kev. The scintillator/crystal is preferably sensitive to radiation of energy between 10 keV and 70 keV. The scintillator/crystal is preferably sensitive to radiation of energy between 5 keV and 80 keV. The scintillator/crystal is preferably not sensitive to radiation of energy greater than 500 keV, more preferably energy greater than 250 keV and ideally radiation of greater than 150 keV.

Preferably the third type detector is the same as the first type detector apart from the third type detector being collimated.

Preferably the scintillator/crystal is optically connected to a photomultiplier. The photomultplier preferably generates a signal in response to a scintillation. Preferably the signal, directly or indirectly is fed to a processor.

The third type detector is preferably provided between two first type detectors.

The field of view of the third type of detector may be defined by a collimator provided between the third type detector and the investigating location. The collimated is preferably places adjacent to the third type detector. The field of view defined by the collimator may be conical.

Preferably the collimator material obscures a portion of the third type detector and particularly the scintillator/crystal thereof. The portion may be over 50% of the scintillator/crystal and more preferably at least 70% thereof. The area or volume of the scintillator/crystal of the third type detector which is sensitive to emissions from the investigating location may be 50% or less of the area or volume of the scintillator/crystal of the first type detector which is sensitive to emissions from the investigating location, The value may be 40% or less, possibly even 30% or less and preferably 20% or less.

Preferably all of the investigating location is within the field of view of at least one of the third type of detectors. Preferably all of the investigating location is within the field of view of each of the third type of detectors.

The third type detector may be used to verify the accurate performance of the first detector type, particularly when a high count rate is experienced. Preferably the energy range to which the third detector type is sensitive is the same as the energy range to which the first type detector is sensitive.

Preferably the range of activity levels for which the first type detector instrument is sensitive is lower than the range of activity levels for which the third type detector instrument is sensitive. Preferably the two ranges overlap partially.

The first type of detector is preferably used to provide information on the radioactive material associated with the body of material where the count rate for the third type detector is below a count rate value. The count rate value which defines this threshold may be preset and/or may be variable between operations. Preferably the third type detector is used to provide information on the radioactive material associated with the body of material where the count rate for the third type detector is at or above a count rate value. The count rate value may be a count rate value at or above which the accuracy of a determination made using the first type detector is questionable, for instance when the count rate is too high to be handled by the first type detector and/or its supporting electronics.

The third type detector may be used to provide information on the radioactive material associated with the body of material where the count rate for the second type detector is higher than for the first type detector. A higher count rate value for the third type detector than the first type detector may indicate a count rate value for the first type detector which is of questionable accuracy, for instance when the count rate is too high to be handled by the first type detector and/or its supporting electronics.

The third type detector may be used to provide information on the radioactive material associated with the body of material where the count rate for the first type detectors is above a count rate value. The count rate value may be a count rate value at which the accuracy of the information obtained from the first type detector is questionable. The count rate value may be pre-determined.

The third type detector may be used to provide information on the radioactive material associated with the body of material where the count rate for the first type detectors is below a count rate value and/or above a count rate value and/or where the third type detector count rate is higher than the first type detector count rate.

The apparatus may provide an indication as to the presence of a count rate for the third type detector when none is detected for the first type detector and/or the level detected is below a certain count rate value and/or where the third type detector count rate is higher than the first type detector count rate. The indication may be visual and/or audible. The presence of such a count rate may trigger an alarm. The alarm may be visual and/or audible. The presence of such a count rate may inhibit one or more operations of the instrument, such as the production of a document on the radioactivity associated with the body of material.

The seventh aspect of the invention may include any of the features, options or possibilities set out elsewhere in this application, including the other aspects.

According to a eighth aspect of the invention we provide a method for obtaining information on radioactive material associated with a body of material, the method including
  providing an apparatus including a first type detector and a third type detector;
  introducing a body of material to an investigating location by the apparatus;
  detecting emissions from the radioactive material associated with the body of material, over a period of time, using the first type detector, the first type detector generating first type detector signals;
  detecting emissions from the radioactive material associated with the body of material over a period of time, using the third type of detector, the third type of detector generating third type detector signals;
  processing the first type detector signals and/or third type signals to give the information on the radioactive material associated with the body of material.

The third type detector may be used to verify the accurate performance of the first detector type, particularly when a high count rate is experienced. Preferably the energy range to which the third detector type is sensitive is the same as the energy range to which the first type detector is sensitive.

Preferably the range of activity levels for which the first type detector instrument is sensitive is lower than the range of activity levels for which the third type detector instrument is sensitive. Preferably the two ranges overlap partially.

The first type of detector is preferably used to provide information on the radioactive material associated with the body of material where the count rate for the third type detector is below a count rate value. The count rate value which defines this threshold may be preset and/or may be variable between operations. Preferably the third type detector is used to provide information on the radioactive material associated with the body of material where the count rate for the third type detector is at or above a count rate value. The count rate value may be a count rate value at or above which the accuracy of a determination made using the first type detector is questionable, for instance when the count rate is too high to be handled by the first type detector and/or its supporting electronics.

The third type detector may be used to provide information on the radioactive material associated with the body of material where the count rate for the first type detectors is above a count rate value. The count rate value may be a count rate value at which the accuracy of the information obtained from the first type detector is questionable. The count rate value may be pre-determined.

The third type detector may be used to provide information on the radioactive material associated with the body of material where the count rate for the third type detector is higher than for the first type detector. A higher count rate value for the third type detector than the first type detector may indicate a count rate value for the first type detector which is of questionable accuracy, for instance when the count rate is too high to be handled by the first type detector and/or its supporting electronics.

The third type detector may be used to provide information on the radioactive material associated with the body of material where the count rate for the first type detectors is below a count rate value and/or above a count rate value and/or where the third type detector count rate is higher than the first type detector count rate.

The apparatus may provide an indication as to the presence of a count rate for the third type detector when none is detected for the first type detector and/or the level detected is below a certain count rate value and/or where the third type detector count rate is higher than the first type detector count rate. The indication may be visual and/or audible. The presence of such a count rate may trigger an alarm. The alarm may be visual and/or audible. The presence of such a count rate may inhibit one or more operations of the instrument, such as the production of a document on the radioactivity associated with the body of material.

The eighth aspect of the invention may include any of the features, options or possibilities set out elsewhere in this application, including the other aspects.

According to a ninth aspect of the invention we provide apparatus for obtaining information on radioactive material associated with a body of material, the apparatus including:
  a first type detector, the first type detector having a field of view which includes at least part of an investigating location; and
  a fourth type detector, the fourth type detector having a field of view which includes at least part of the investigating location.

The information may be the presence of radioactive material associated with the body of material at above a level, particularly when the information is obtained from the fourth type detector. The quantity may be expressed as an activity level per unit mass of the body of material, particularly as a Bq/g value.

The fourth type of detector may be a neutron detector. The fourth type of detector may be an $He^3$ type detector. The fourth type detector may be enclosed in a plastics moderator, such as polyethylene. Preferably the fourth type detector is used to obtain a total neutron count for the investigating location.

The fourth type detector is preferably provided away from the two first type detectors. Preferably the fourth type detector is provided outside that part of the field of view extending between the first type detector and the investigating location. In use, the fourth type detector may be provided on the opposite side of the body of material to the first type detector.

The field of view of the fourth type of detector may be non-collimated.

Preferably all of the investigating location is within the field of view of at least one of the fourth type of detectors. Preferably all of the investigating location is within the field of view of each of the fourth type of detectors.

The fourth type detector may be used to verify the accurate performance of the first detector type, particularly when a high count rate is experienced. Preferably the radiation to which the fourth detector type is sensitive is less intense and/or more penetrating emissions than those to which the first type detector is sensitive. Preferably the range of activity levels for which the first type detector instrument is sensitive is lower than the range of activity levels for which the fourth type detector instrument is sensitive. Preferably the two ranges overlap partially.

The first type of detector is preferably used to provide information on the radioactive material associated with the body of material where the count rate for the fourth type detector is below a count rate value. The count rate value which defines this threshold may be preset and/or may be variable between operations. Preferably the fourth type detector is used to provide information on the radioactive material associated with the body of material where the count rate for the fourth type detector is at or above a count rate value. The count rate value may be a count rate value at or above which the accuracy of a determination made using the first type detector is questionable, for instance when the count rate is too high to be handled by the first type detector and/or its supporting electronics.

The fourth type detector may be used to provide information on the radioactive material associated with the body of material where the count rate for the first type detectors is above a count rate value. The count rate value may be a count rate value at which the accuracy of the information obtained from the first type detector is questionable. The count rate value may be pre-determined.

The fourth type detector may be used to provide information on the radioactive material associated with the body of material where the count rate for the first type detectors is below a count rate value. The count rate value may be a count rate value of zero. The count rate value may be a count rate value which is of questionable accuracy, for instance when the count rate is too high to be handled by the first type detector and/or its supporting electronics.

The fourth type detector may be used to provide information on the radioactive material associated with the body of material where the count rate for the first type detectors is above a count rate value. The count rate value may be a count rate value at which the accuracy of the information obtained from the first type detector is questionable. The count rate value may be pre-determined.

The fourth type detector may be used to provide information on the radioactive material associated with the body of material where the count rate for the first type detectors is below a count rate value and/or above a count rate value and/or where the fourth type detector count rate is higher than the first type detector count rate.

The fourth type of detector may be used to indicate the presence of shielding material within the body of material. The presence of shielding material may be indicated by the fourth type detector count rate being higher than expected relative to a first type detector count rate.

The apparatus may provide an indication as to the presence of a count rate for the fourth type detector when none is detected for the first type detector and/or the level detected is below a certain count rate value and/or where the fourth type detector count rate is higher than the first type detector count rate. The indication may be visual and/or audible. The presence of such a count rate may trigger an alarm. The alarm may be visual and/or audible. The presence of such a count rate may inhibit one or more operations of the instrument, such as the production of a document on the radioactivity associated with the body of material.

The ninth aspect of the invention may include any of the features, options or possibilities set out elsewhere in this application, including the other aspects.

According to a tenth aspect of the invention we provide a method for obtaining information on radioactive material associated with a body of material, the method including
 providing an apparatus including a first type detector and a fourth type detector;
 introducing a body of material to an investigating location by the apparatus;
 detecting emissions from the radioactive material associated with the body of material, over a period of time, using the first type detector, the first type detector generating first type detector signals;
 detecting emissions from the radioactive material associated with the body of material over a period of time, using the fourth type of detector, the fourth type of detector generating fourth type detector signals;
 processing the first type detector signals and/or fourth type signals to give the information on the radioactive material associated with the body of material.

The fourth type detector may be used to verify the accurate performance of the first detector type, particularly when a high count rate is experienced. Preferably the emissions to which the fourth detector type is sensitive are less intense and/or more penetrating than the emissions to which the first type detector is sensitive. Preferably the range of activity levels for which the first type detector instrument is sensitive is lower than the range of activity levels for which the fourth type detector instrument is sensitive. Preferably the two ranges overlap partially.

The first type of detector is preferably used to provide information on the radioactive material associated with the body of material where the count rate for the fourth type detector is below a count rate value. The count rate value which defines this threshold may be preset and/or may be variable between operations. Preferably the fourth type detector is used to provide information on the radioactive material associated with the body of material where the count rate for the fourth type detector is at or above a count rate value. The count rate value may be a count rate value at or above which the accuracy of a determination made using the first type detector is questionable, for instance when the count rate is too high to be handled by the first type detector and/or its supporting electronics.

The fourth type detector may be used to provide information on the radioactive material associated with the body of material where the count rate for the first type detectors is above a count rate value. The count rate value may be a count rate value at which the accuracy of the information obtained from the first type detector is questionable. The count rate value may be pre-determined.

The fourth type detector may be used to provide information on the radioactive material associated with the body of material where the count rate for the fourth type detector is higher than for the first type detector. A higher count rate value for the fourth type detector than the first type detector may indicate a count rate value for the first type detector which is of questionable accuracy, for instance when the count rate is too high to be handled by the first type detector and/or its supporting electronics.

The fourth type detector may be used to provide information on the radioactive material associated with the body of material where the count rate for the first type detectors is below a count rate value and/or above a count rate value and/or where the fourth type detector count rate is higher than the first type detector count rate.

The fourth type of detector may be used to indicate the presence of shielding material within the body of material. The presence of shielding material may be indicated by the fourth type detector count rate being higher than expected relative to a first type detector count rate.

The apparatus may provide an indication as to the presence of a count rate for the fourth type detector when none is detected for the first type detector and/or the level detected is below a certain count rate value and/or where the fourth type detector count rate is higher than the first type detector count rate. The indication may be visual and/or audible. The presence of such a count rate may trigger an alarm. The alarm may be visual and/or audible. The presence of such a count rate may inhibit one or more operations of the instrument, such as the production of a document on the radioactivity associated with the body of material.

The tenth aspect of the invention may include any of the features, options or possibilities set out elsewhere in this application, including the other aspects.

Preferred embodiments of the invention may include the use of first type detectors in combination with second type detectors and/or third type detectors and/or fourth type detectors.

The apparatus and/or methods of the present invention may be used to obtain information about a body of material at the time it is first placed in a container, for instance a bag. The apparatus and/or method may be performed at the location where such bodies of material are formed, for instance at decommissioning locations. The apparatus and/or methods of the present invention may be used to obtain information about a body of material that has previously been formed in a container, for instance a bag. The apparatus and/or method may be performed at the location where such previously formed bodies of material have been stored. The apparatus and/or methods of the present invention may be used to obtain information about the category of waste a body of material should be placed in. The apparatus and/or method may be used to reclassify the category of waste previously categorised waste should be placed in. The apparatus and/or methods of the present invention may be used to quantify the radioactive material associated with a body of material as part of the inventory kept for a storage site. The apparatus and/or methods of the present invention may be used to requantify the radioactive material associated with a body of material as part of the inventory kept for a storage site.

DESCRIPTION OF THE DRAWINGS

Various embodiments of the invention will be described, by way of example only, and with reference to the accompanying figures in which:

FIG. 2 is a schematic illustration of a first embodiment of the present invention;

FIG. 3 is an illustration of the variation in the energy spectrum emitted by waste including plutonium at a first age and at a second age for the waste;

FIG. 4 is an enhanced embodiment of the FIG. 2 embodiment, featuring a metal detection facility FIG. 5 is an enhanced embodiment of the FIG. 2 embodiment, featuring a further gamma detection facility;

FIG. 6 is an enhanced embodiment of the FIG. 2 embodiment, featuring a further collimated gamma detection facility; and FIG. 7 is an enhanced embodiment of the FIG. 2 embodiment, neutron detection facility.

DETAILED DESCRIPTION OF THE PREFERRED EMBODIMENTS

Figure 1:
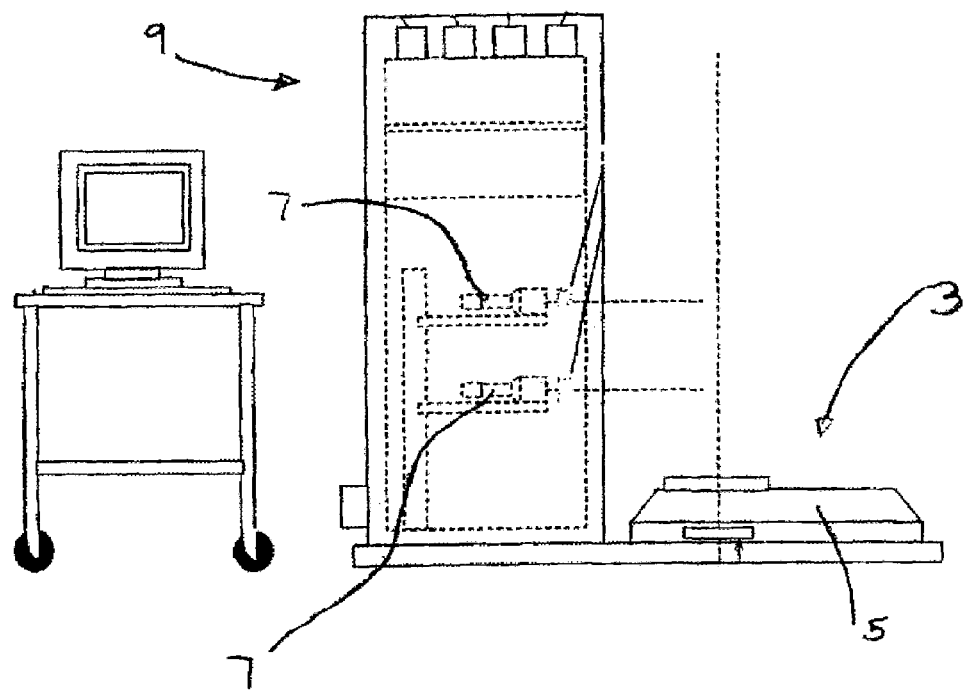
FIG. 1 is a schematic illustration of a prior art instrument.

The instrument illustrated in FIG. 1 is a schematic representation of an existing instrument, the Applicant's DRUM-SCAN™: LRGS packet monitor. This is used to investigate waste samples, generally presented in packets, which contain significant gamma and/or beta emitters. Other configurations of instrument, taking a similar approach, but designed to monitor other types of container, such as drums, are also possible.

The packet is presented to an investigating location 3 above a turntable 5. The turntable 5 is used to rotate the packet during investigation. A conveying table leading to and from the investigating location 3 or lifting means can be used to introduce and remove the packets.

Two gamma detectors 7 are provided in investigating assembly 9. The gamma detectors 7 are collimated to define their field of view; a slice substantially parallel to the surface of the turntable 5, extending through the packet. Low resolution gamma spectroscopy, LRGS, detectors are used and these are in the form of NaI crystals which are 7.62 cm thick and 7.62 cm in diameter. The detectors are selected to look particularly for gamma emissions of the MeV level energy. Such gamma energy emissions are found in fission product containing waste and certain forms of uranium containing waste, amongst others.

The count rates generated by the detectors 7 are fed to processing electronics. The electronics make a determination of the isotopic characteristics of the waste and/or assay of the amount of radioactive material present.

Instruments according to this design are good at measuring waste which includes high energy gamma emissions, such as uranium containing wastes. In the case of other waste types, particularly plutonium containing low level wastes, such instruments can be used but are not as sensitive as required. As a consequence, the results are reported cautiously and the amount of radioactive material stated as present may well be heavily overestimated.

Waste of the above mentioned problem type is generally assigned to one of three categories of waste in the UK. Waste with an activity level below 0.4 Bq/g is categorised as exempt and can be sent to civil waste sites; waste with an activity level between 0.4 Bq/g and 4000 Bq/g is categorised as alpha Low Level Waste, LLW, and can be stored at specialised but low level waste sites; and waste with an activity level above 4000 Bq/g is categorised as Plutonium Contaminated Material, PCM, and needs storing in highly specialised seismically engineered stores. Similar categories and approaches are applied in other countries. The different categories of waste carry with them different costs for handling and storage of the waste, with each category being many times the cost of the level below it.

The problem with overestimates of the radioactive content of a waste packet, which ever instrument form generates the result, is that this can give rise to the waste being categorised in a category of waste higher than needed. This means the cost is massively increased unnecessarily. This problem is particularly apparent with the boundary between LLW and PCM category waste as the difficulties of measurement using prior art approaches are highest here, the problems with an under measurement occurring are greatest from the storage /disposal authorisation and process safety point of view and the cost increase by being a category too high is enormous.

The present invention aims to address issues with prior art instruments and methods, including, but not limited to, a more accurate measurement of such wastes and measurements of such wastes which are more resilient as being accepted as the true measure.

Attempts have been made to indicate whether radioactive material is present in a waste packet or not present at all using an array of gamma detectors. If no radioactive material is deemed present, the waste can go to civil waste sites. However, such instruments are very limited in the type of waste they can, and indeed are, intended to accommodate. Furthermore, the instruments only provide a no radiation/ radiation present indication. The instruments in question, the Los Alamos National Laboratory, LANL, instruments know as WAND and HERCULES are intended to handle office type/paper bin style waste. As such they are aimed at establishing paper as being clean, rather than needing to be treated as low level waste.

To function, the instruments rely, respectively, on the volume of waste be spread thinly (no more than 5 cm thickness) on a conveyor to ensure expose of any sources to the detectors or rely upon the container being small and hence having only a short distance between its mid point and the outside (16 kg or less). Otherwise the required accuracy cannot be obtained. Even then care must be taken that no "problem" waste materials are introduced to these instruments as they would be unable to accurately account for them. The "problem" materials include shielding/attenuating materials such as metals, glass and ceramics which are commonly found in industrial waste materials. Such instruments are thus aimed at entirely different types of waste, are extremely limited in terms of the range of materials they can handle and are not concerned with measurements of waste having the level of contamination of principle concern to the applicant. They are also limited to a present/absent style determination, rather than any quantification of the radioactive sources detected.

As a consequence, the present invention aims to address issues with prior art instruments and methods, including, but not limited to, making an actual, accurate quantification of the radioactive material present in such wastes and making accurate measurements of real world, variable wastes, such as wastes including plastics and/or glass and/or rubber and/or wood and/or fabric materials. Such wastes might include gloves, boots, coveralls, respirators etc.

The present invention is based around the embodiment illustrated in FIG. 2 and uses NaI detectors which are specifically designed to be sensitive to low energy level radiation. As a consequence they are concerned with totally different energy levels to those considered in previous DRUMSCAN instruments through their detectors.

Two detectors 20 are deployed in an investigation assembly 22 to one side of an investigation location 24 above a turntable 26. A polypropylene or perspex screen 28 is provided in one wall 30 of the investigation assembly, which is otherwise a metal cabinet with a 2-3 mm thick steel skin. The environment 32 within the investigation assembly is thermostatically controlled at above the ambient temperature of the instrument's environment so as to keep the detector efficiency constant. The screen 28 is positioned between the detectors 20 and the investigation location 24 and maintains the dust and contamination seal for the detector's environment 32. The exclusion of dust and radioactive material from this environment 32 is also desirable and such a screen 28 is one way of achieving this.

The detectors 20 are both the same and feature NaI crystals 34 optically connected to a photomultiplier 36 in each case. Unlike other crystals previously employed in the investigation of radiation from waste, the crystals are extremely thin, around 1.6 mm. The diameter of the crystal is large, around 127 mm to give as high a count as possible. The careful selection of the crystal dimensions mean that the instrument is rendered sensitive to the desired energy range of emissions, but avoids detecting emissions at other energies which are not useful to the measurement and indeed are detrimental thereto. As such, the crystal detects in the desired X-ray energy range, 10-30 keV, and the desired gamma energy range, 55-65 keV, but is not sensitive to ambient radiation which would otherwise give a false measurement, for instance in the 100's of keV range.

In use, a packet 1 is introduced to the investigation location 24 and is weighed. Counts are measured for each of the detectors 20 over a period of time and are converted into count rates as a result. The count rates may be corrected for ambient conditions by subtracting a background count rate from the measured count rates. The count rates or the average thereof, may be corrected according to a sensitivity factor for the energy/isotope being considered. Sensitivity factors can be obtain by considering known sources in a calibration process.

From the count rate, corrected as desired, the overall activity can be determined in the following way.

From the count rate for a particular energy, the amount of that isotope (or isotopes) can be established. Thus for plutonium containing waste, the count rate associated with the 60 keV energy emission from $^{241}$Am enables the amount of $^{241}$AM present to be determined. For most waste, its age is known to a reasonable accuracy when compared with the half lives of the isotopes being considered. In addition, wastes from defined plant areas have so called "fingerprints", that is to say known ratios between their isotopes because of the nature of the material being processed in that plant. These ratios are established early in the life of a plant or process stream by sampling and chemical analysis. Thus waste which is 12 months old and from a particular plant, will have a series of known ratios between the amount of $^{241}$Am present and the other isotopes present. In the case of plutonium containing wastes, the isotopes are $^{238}$Pu, $^{239}$Pu, $^{240}$Pu, $^{241}$Pu and $^{142}$Pu. Thus from the $^{241}$Am amount the amounts of the other isotopes can be established and, potentially by dividing by the weight of the waste, a total activity, expressed in Bq/g, can be obtained. If desired, the appropriate specific activity can be used to give the mass of the respective isotope present. The total alpha and/or total beta activity can also be calculated. One or more or all of these results can be corrected for attenuation by the waste itself. One such correction method includes using the weight of the packet 1 to arrive at a density for the waste and correct accordingly. Correction in respect of the particular energy used in the determination can also be made. Again standards of known energy and the impact of known density levels on the counts measured for calibration samples can be used to obtain the necessary corrections.

An equivalent approach can be taken to the determination of the isotopes present in mixed oxide (MOX) uranium containing waste from the $^{241}$Am level, or from starting with a determination of the amount of another isotope where characteristic energies exist, for instance $^{238}$U and/or $^{235}$U etc.

In respect of plutonium containing waste, $^{241}$Am is a particularly useful isotope to consider as it has a useful emission energy in terms of the 60 keV emission and, with a half life of over 400 years, does not decay significantly during the time in which such wastes are considered. The $^{241}$Am is a daughter of $^{241}$Pu which has a 14.4 year half life.

When the waste is very new, the amount of $^{241}$Am in it may be so low as to be undetectable. FIG. 3 illustrates two spectra, one for old waste, A, which includes a prominent 60 keV peak for $^{241}$Am and another for young waste, B, which does not include such a peak. If young waste is being considered, then an alternative approach can be taken. In such a case, the count rate in the x-ray window, potentially 10 keV to 30 keV, is taken. From the fingerprint information on the waste, the isotopes which are present are known. Furthermore, the emission activities of those isotopes are known from reference materials. As such the x-ray activity can be equated to the known isotopic mixture of plutonium present and solved to give the activity. Again using the ratios, the $^{241}$Am activity can be obtained from this. Again the above forms of correction may be applied.

The decision as to which approach to use: low energy gamma emitting isotope to calculate x-ray emitting isotopes (for instance, $^{241}$Am to Pu) or x-ray emitting isotopes to low energy gamma emitter (for instance, Pu to $^{241}$Am), can be based on which is the most appropriate set of counts to consider. Thus where the $^{241}$Am peak is statistically significant relative to the background then that may be used. Equally, where it is not statistically discernable with the desired degree of confidence from the background then the x-ray approach may be used.

In many cases, both approaches can be taken. A comparison of the results obtained from both approaches offers the chance to verify the declared history or fingerprint for the waste. Thus significant differences between the activity calculated by the two approaches could indicate a questionable history. This is a useful benefit of the present invention.

A number of further embodiments of the invention based around this approach are possible and each provide further benefits.

In the embodiment of FIG. 4 a metal detector 40 has been added to the system on the other side of the investigation location 24 from the detectors 20. Other positions could be used, but it is desirable that the position of the metal detector 40 should not interfere with radiation from the investigation location 24 reaching the detectors 20. The benefit of the metal detector 40 is that it enables the operator to confirm that there is no metallic material within the packet 1. This is important as if significant metallic material were present it could shield radioactive sources and so prevent their accurate detection and quantification by the instrument. The people controlling the feed of waste to the packet may believe that no metallic material is fed to the packet, but this feature provides important verification of that being the actual situation. This gives benefit to the invention in giving increased confidence in the result and in addressing one source of concern which could otherwise lead to an unduly relaxed approach being taken on the category of waste to which the packet was assigned.

In the embodiment of FIG. 5 a further gamma detector 50 has been added to the instrument. The further detector 50 is positioned between the two detectors 20. It features a NaI crystal 52 connected optically to the same type of photomultiplier 36 used for the detectors 20. The crystal 52 is considerably thicker than in the detectors 20 at 76.2 mm thick and 76.2 mm in diameter. Due to its thickness this crystal is designed to be sensitive to far higher energy level gamma emissions than the detectors 20.

The benefit of this additional detector 52 comes in to play if the level of emissions from the waste is far higher than expected. In such a case, the very high number of counts in the low energy gamma and x-ray part of the spectrum could cause the detectors (either due to their behaviour or that of their supporting electronics) to suffer significant "dead-time" or at the limit, to stop counting. This might give the impression that the count for the packet 1 was low or zero as a result, even though the reality was far from that. The additional detector 52 gives a discernable count rate for emissions in the energy range to which it is sensitive, before the count rate reaches the levels where the detectors 20 stop functioning accurately. As a result, even if no count arises from the detectors 20 the instrument notes a count from the detector 52 and hence the presence of radiation. One possible part of the spectrum for which such a detector could be designed to be sensitive would be the gamma emissions around 380 keV observed for plutonium containing waste. The energies detected by the detector 52 are generally too high to be detected by the detectors 20. Again this feature provides important verification and some sentencing safeguards of the actual position.

In the FIG. 6 embodiment, another approach to the same issue as addressed in the FIG. 5 embodiment is taken. In this case the two gamma detectors 20 are supplemented by a further collimated gamma detector 60. The gamma detector 60 itself is of the same type as the detector 20. However, in this case a collimator 62 is positioned between the detector 60 and the investigation location 24. The collimator is shaped so as to allow the detector 60 to see all of the packet 1 in the investigating location 24. However, the collimator obscures a significant part of the front face of the crystal 64. Because of this, the detectors 20 and detector 60 will detect emissions of the same energy range. However, the number of such emissions reaching the detector 60 is far lower than those reaching the detectors 20. As a result, even when the detector 60 is exposed to highly contaminated waste, the count rate with respect to the low energy gamma emissions and x-ray emissions is below the level at which the detector/electronics encounter difficulties in coping. Again, whilst the detectors 20 may give no count and hence imply no radioactivity in the waste, the instrument notes the presence of radioactivity due to the count from detector 60. An alternative way of providing important verification of the actual position is thus provided. A benefit of this approach is that the detector and supporting electronics can be the same for each of the detectors. The only difference is the collimation of one of the detectors.

In the FIG. 7 embodiment, a neutron detector 70 has been introduced to the basic configuration of FIG. 2. The neutron detector 70 is of the He$^3$ type and is positioned so as not to interfere with the gamma detectors 20. The neutron detector 70 is moderated by enclosing it in polyethylene 72. The neutron detector 70 is used to obtain a total neutron count from the investigation location 24. The results from the neutron count are useful for a number of reasons. Firstly, again it would reveal the presence of plutonium containing material when the amount of plutonium is higher than expected and hence the high level of emissions causes a zero count from the gamma/x-ray detectors 20. In such a case, the detectors 20 might suggest low or no contamination, but the instrument notes the presence of waste due to the neutron count. Secondly, even in situations where the detector 20 count occurs, the neutron detector 70 provides for a measure of the emissions on which unexpected shielding due to metallic material being presence has less impact. Thus, when the two measures of contamination feature a discrepancy between the gamma/x-ray measurement and the neutron measurement this can be used as an indication that shielding material, such as metallic material, is present. The neutron detector can thus achieve the same purpose as a metal detector and supplement it. Again greater confidence is given that potential sources of problems or inaccuracy do not exist.

Where radiation is detected by one of the additional detectors, but not by the x-ray/low energy gamma detector because its count capability has been exceeded, the possibility exists for linking such an event to a warning, such as an audible or visual alarm, or a restriction on the user possibilities for the instrument, such as inhibiting a printout of the results in a particular format or at all.

The use of the metal detecting facility, illustrated in the FIG. 4 embodiment is useful in all embodiments of the instrument, but is particularly useful when: a) the basic embodiment of the instrument is used together with the high energy gamma detector facility, illustrated in FIG. 5; and when b) the basic embodiment of the instrument is used with the collimated gamma detector facility, illustrated in FIG. 6. In each case, the metal detection facility provides assurance that no significant metallic material is present. Otherwise it could be present and acting as a shield, but without the instrument being able to determine this. The neutron detection facility of FIG. 7, provides a route for sensing higher levels of activity without the problems experienced by other X or gamma ray methods of signal attenuation when significant metallic waste is present.

The basic embodiment of the invention in combination with all three of the additional features is particularly advantageous as it provides a high level of confidence that the assay is accurate.

Through the use of the methods and apparatus of the present invention more accurate classification of waste in containers such as packets, into the correct waste category can be made. This represents substantial potential savings. Furthermore, the invention provides the possibility for reclassifying waste already in store to potentially justify its removal to a lower level of waste storage facility.

As well as offering improvements relative to a classification level, the invention also offers the potential to more accurately quantify the amount of radioactive material within a container, such as a packet. This is important as many waste sites have both a volume capacity (a maximum volume of waste) and a maximum radiological capacity (a maximum amount of radioactive material). Accurate measurement of the amount of radioactive material in a packet ensures that the risk of a sites radiological capacity being met before its volume capacity is minimised. Again this represents a significant potential cost saving.

The methods and apparatus of the present invention: can be used at the location and time when waste is first contained for subsequent disposal after its use has finished (such as at a decommissioning site, when protective clothing has been finished with); can be used at a central location which handles recently bagged waste for a site as a whole; can be used to look at old waste already stored; and can be used to more accurately quantify existing wastes.

What is claimed is:

1. A method for obtaining information on radioactive material associated with a body of material, the method comprising:
   providing an apparatus including a first type detector and a housing;
   introducing a body of material to an investigating location by the apparatus;
   detecting emissions from the radioactive material associated with the body of material, over a period of time, using the first type detector, the first type detector generating first type detector signals;
   processing the first type detector signals to give the information on the radioactive material associated with the body of material, wherein where the information is that the quantity of radioactive material is at or above a first threshold and below a second higher threshold, the body of material is to be removed to a second type of location and where the information is that the quantity of radioactive material is above a second threshold, the body of material is to be removed to a third type of location; and
   wherein, the housing encloses the first type detector, the housing includes a non-metallic portion between the first type detector and that part of the investigating location within the field of view of the first type detector, the housing encloses a first type detector environment and the first type detector environment is thermostatically controlled.

2. A method according to claim 1 in which the processor determines the amount of an isotope present in the body of material from the count rate at a particular energy, the energy being 60 keV+/−5 keV.

3. A method according to claim 2 in which the processor determines the amount of other isotopes and/or elements present by reference to one or more known ratios between the measured isotope and the other isotopes and/or elements, the ratios having been determined previously by chemical assay.

4. Apparatus for obtaining information on radioactive material associated with a body of material, the apparatus comprising:
   a first type detector, the first type detector detecting radioactivity and so providing first type detector signals representing a count rate for the first type detector and the first type detector having a field of view which includes at least part of an investigating location;
   a second type detector, the second type detector detecting radioactivity and so providing second type detector signals representing a count rate for the second type detector and the second type detector having a field of view which includes at least part of the investigating location, wherein the first type detector is sensitive to a range of activity levels and the second type detector is sensitive to a range of activity levels, the range of activity levels for which the first type detector is sensitive being lower than the range of activity levels for which the second type detector is sensitive; and
   a data processor for receiving the first type detector signals and the second type detector signals, the data processor being adapted to process only the second type detector signals to provide the information on the radioactive material associated with the body of material when the count rate for the second type detector is at or above a given count rate value.

5. Apparatus according to claim 4 in which the first type detector is sensitive to radiation of energy in a range between 10 keV and 70 keV.

6. Apparatus according to claim 4 in which the second type detector is sensitive to radiation of energy in a range between 250 keV and 450 keV.

7. Apparatus according to claim 6 in which the second type detector is not sensitive to radiation of energy less than 100 keV.

8. Apparatus according to claim 4 in which the first and second type detectors each comprise a same type of scintillator/crystal.

9. Apparatus according to claim 4 in the second type detector comprises a scintillator/crystal having a thickness of between 1.00 mm and 3.00 mm.

10. Apparatus according to claim 4 in which the first and second type detectors each comprise a scintillator/crystal that is sensitive to radiation of energy between 10 keV and 70 keV.

11. Apparatus according to claim 4 in which the second type detector comprises a scintillator/crystal and is collimated using a collimator material that obscures over 50% of the second type detector scintillator/crystal.

12. Apparatus according to claim 4 in which all of the investigating location is within the field of view of the second type of detector.

13. Apparatus according to claim 4 in which the second type detector is sensitive to neutrons.

14. A method for obtaining information on radioactive material associated with a body of material, the method comprising:
   providing an apparatus including a first type detector and a second type detector;
   introducing the body of material to an investigating location at the apparatus;
   detecting emissions from the radioactive material associated with the body of material, over a period of time, using the first type detector, the first type detector generating first type detector signals representing a count rate for the first type detector;
   detecting emissions from the radioactive material associated with the body of material over a period of time, using the second type detector, the second type detector generating second type detector signals representing a count rate for the second type detector, wherein, the first type detector is sensitive to a range of activity levels and the second type detector is sensitive to a range of activity levels, the range of activity levels for which the first type detector is sensitive being lower than the range of activity levels for which the second type detector is sensitive; and
   processing the first type detector signals or the second type detector signals to give the information on the radioactive material associated with the body of material wherein only the second type detector signals provide the information on the radioactive material associated with the body of material when the count rate for the second type detector is at or above a given count rate value.

15. A method according to claim 14 in which the second type detector is used to verify the accurate performance of the first type detector.

16. A method according to claim 14 in which range of activity levels for which the first type detector is sensitive and the range of activity levels for which the second type detector is sensitive overlap partially.

17. A method according to claim 14 in which the first type detector is used to provide the information on the radioactive material associated with the body of material when the count rate for the second type detector is below a count rate value.

18. A method according to claim 14 in which the second type detector is used to provide the information on the radioactive material associated with the body of material when the count rate for the second type detector is at or above a count rate value.

19. A method according to claim 14 in which the second type detector is used to verify the accurate performance of the first type detector, the first type detector being sensitive to radiation of energy in a first energy range and the second type detector being sensitive to radiation of energy in a second energy range, the second energy range being the same as the first energy range.

20. A method according to claim 14 in which the range of activity levels for which the first type detector is sensitive is lower than the range of activity levels for which the second type detector is sensitive, the two ranges overlapping partially.

21. A method according to claim 14 in which the first type detector is used to provide the information on the radioactive material associated with the body of material when the count rate for the second type detector is below a count rate value.

22. A method according to claim 14 in which the second type detector is sensitive to neutrons.

23. A method for obtaining information on radioactive material associated with a body of material, the method comprising:
   providing an apparatus including a first type detector and a housing;
   introducing a body of material to an investigating location by the apparatus;
   detecting emissions from the radioactive material associated with the body of material, over a period of time, using the first type detector, the first type detector generating first type detector signals;
   processing the first type detector signals to give the information on the radioactive material associated with the body of material;
   wherein, the housing encloses the first type detector, the housing includes a non-metallic portion between the first type detector and that part of the investigating location within the field of view of the first type detector; and
   wherein when the information is that the quantity of radioactive material is at or above a first threshold and below a second higher threshold, the body of material is to be removed to a second type of location; and wherein when the information is that the quantity of radioactive material is above a second threshold, the body of material is to be removed to a third type of location.

24. A method comprising:
   providing an apparatus including a first type detector and a housing, the housing enclosing a first type detector environment that is thermostatically controlled;
   introducing a body of material to an investigating location by the apparatus, the investigating location including a portion that is within the field of view of the first type detector, the housing enclosing the first type detector and including a non-metallic portion disposed between the first type detector and the portion of the investigating location within the field of view of the first type detector;
   detecting emissions from radioactive material associated with the body of material over a period of time using the first type detector, the first type detector generating first type detector signals; and
   determining radioactivity information corresponding to radioactive material associated with the body of material based on the first type detector signals, wherein the radioactivity information comprises the quantity of radioactive material associated with the body of material;
   removing the body of material to a second type of location if the quantity of radioactive material is at or above a first threshold value and below a second threshold value; and
   removing the body of material to a third type of location if the quantity of radioactive material is at or above the second threshold value.

25. A method comprising:
providing an apparatus including a first type detector and a housing;
introducing a body of material to an investigating location by the apparatus, the investigating location including a portion that is within the field of view of the first type detector, the housing enclosing the first type detector and including a non-metallic portion disposed between the first type detector and the portion of the investigating location within the field of view of the first type detector;
detecting emissions from radioactive material associated with the body of material over a period of time using the first type detector, the first type detector generating first type detector signals;
determining the quantity of radioactive material associated with the body of material based on the first type detector signals;
removing the body of material to a second type of location if the quantity of radioactive material is at or above a first threshold value and below a second threshold value; and
removing the body of material to a third type of location if the quantity of radioactive material is at or above the second threshold value.

* * * * *